UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

COMPOSITION OF MATTER CONTAINING ALUMINA AND MAGNESIA.

1,001,497. Specification of Letters Patent. Patented Aug. 22, 1911.

No Drawing. Application filed July 28, 1910. Serial No. 574,350.

*To all whom it may concern:*

Be it known that I, THOMAS B. ALLEN, of Niagara Falls, Niagara county, New York, have invented a new and useful Composition of Matter Containing Alumina and Magnesia.

My invention is designed to provide a new and useful composition of matter containing oxids of aluminum and magnesium. My composition is of a crystalline nature, and forms abrasive grains which are valuable especially for grinding such materials as soft metals, metallic alloys, leather, wood, &c.

As my preferred process gives the product a molten condition, it may be cast into any desired shape and used for refractory or other purposes. The product consists essentially of alumina and magnesia, with not over 25 per cent. of magnesia; and the product may be varied in hardness and toughness by changing the magnesia content.

In preparing my improved product, I prefer to use an electric furnace to melt the mixture of oxid of aluminum and oxid of magnesium. A suitable furnace for this operation is an electric arc furnace with vertical electrodes depending into the furnace pot or crucible, such as shown in United States Letters Patent No. 929,517, granted to Frank J. Tone, on July 27th, 1909.

The mixture of oxids may be gradually fed into the furnace around the electrodes until the furnace is filled with molten material to the sufficient or desired amount. The current is then turned off and the material allowed to cool, and the ingot may be removed from the furnace and crushed, into various sizes of grains, such as used for abrasive purposes; or the molten material may be cast into any desired shape for refractory material or any other desired use.

Instead of using a mixture of oxid of aluminum and oxid of magnesium, I may use as a source of alumina any ore or mineral such as bauxite, which may contain besides alumina other materials such as the oxids of iron and silicon. As a source of magnesia, any natural ore may be used containing magnesia and other materials such as oxids of aluminum, silicon, iron, and other easily reducible oxids. I prefer to use bauxite as the source of alumina, and magnesite as the source of magnesia, although I do not wish to limit myself to these materials containing such oxids.

Where bauxite and magnesite are used, they are preferably calcined to remove the water from the bauxite and the carbon dioxid and water from the magnesite, and the calcined materials are then mixed together with a sufficient amount of carbon or other reducing material to reduce the major portion of the oxid of iron and oxid of silicon.

As an example of my preferred method, I have melted together a mixture of one hundred parts of calcined bauxite, fifteen parts of calcined magnesite, and six parts of carbon, in an electric furnace, and after melting and reduction have obtained a product consisting of fourteen parts magnesium oxid (MgO) and eighty-four parts aluminum oxid ($Al_2O_3$); the remainder of the material consisting of oxids of titanium iron and silicon. By keeping the temperature of the electric furnace relatively low, I can reduce the oxid of iron and silicon without affecting the oxid of aluminum and oxid of magnesium, on account of the higher heats of formation of the latter oxid. The oxids of iron and silicon when reduced yield a metallic alloy—ferro-silicon—which can be separated from the fused oxids either by tapping the furnace during or after the process or by appropriate mechanical or chemical means after the ingot is removed from the furnace.

The advantages of my invention result from the new and improved product useful for abrasive purposes, and for refractory and other purposes. The magnesia content should not exceed twenty-five per cent. and by varying it I can prepare a series of products of varying hardness and toughness. The content of magnesia material affects the toughness of the product. The ingot is of a crystalline nature, and can be broken up to form grains, or cast into any desired shape as above stated.

Many variations may be made in the proportions of the material, other materials may be contained in the product, and the material may be prepared by other processes, without departing from my invention.

I claim:—

As a new article of manufacture, a homogeneous, crystalline product consisting principally of alumina and magnesia, the ratio of the magnesia to the alumina being less than that represented by the chemical formula $MgAl_2O_3$.

In testimony whereof, I have hereunto set my hand.

THOS. B. ALLEN.

Witnesses:
L. B. COULTER,
R. B. MANLEY.